United States Patent [19]
Wolff

[11] 4,273,887
[45] Jun. 16, 1981

[54] PROCESS FOR PREPARATION OF FOAMS BY CONDENSATION REACTIONS

[75] Inventor: Per L. Wolff, Birkerod, Denmark

[73] Assignee: Koninklijke Emballage Industrie Van Leer B.V., Amstelveen, Netherlands

[21] Appl. No.: 66,582

[22] Filed: Aug. 14, 1979

[30] Foreign Application Priority Data

Jul. 10, 1979 [NL] Netherlands .......................... 7905379

[51] Int. Cl.³ .............................................. B29D 27/04
[52] U.S. Cl. ...................................... 521/188; 264/26; 264/53; 264/236; 521/103; 521/186
[58] Field of Search ...................... 264/48, DIG. 2, 26, 264/236; 521/188, 186, 103

[56] References Cited

U.S. PATENT DOCUMENTS

| | | | |
|---|---|---|---|
| 3,761,209 | 9/1973 | Hanton | 425/174.8 R X |
| 3,821,337 | 6/1974 | Bunclark et al. | 264/46.3 X |
| 3,919,127 | 11/1975 | Larsen et al. | 521/106 |
| 4,016,111 | 4/1977 | Wolff et al. | 521/103 |
| 4,026,980 | 5/1977 | Hubbard | 264/46.4 X |
| 4,051,211 | 9/1977 | Beser et al. | 264/48 X |

Primary Examiner—Philip Anderson
Attorney, Agent, or Firm—Lawrence Rosen

[57] ABSTRACT

An improved process for the production of thermoset foams having a predetermined shape by subjecting a reactive amine to a condensation reaction in an enclosed mould cavity, wherein the reaction is carried out under conditions whereby by-product water found during the reaction is substantially free to move out into a space adjacent to and in communication with said foam, and controlling the temperature and care of said foam by regulation of the web bulb temperature of the gaseous mass inside said space. Foam products made in accordance with the process of the invention, e.g. urea-formaldehyde furfuryl alcohol-based insulating foams, are also claimed.

14 Claims, 5 Drawing Figures fig-1 fig-2 fig-3 fig-4

PROCESS FOR PREPARATION OF FOAMS BY CONDENSATION REACTIONS

The present invention relates to a process for the preparation of a foam having a predetermined shape, wherein in the presence of a catalyst, a blowing agent and other additives, a reactive resin component is subjected to a condensation reaction.

BACKGROUND

In the building industry of today there is a need for insulation material which has better properties than the materials used up to now. Shortage in energy, especially from natural sources, dictates that tomorrow's buildings shall have a much better heat insulation than nowadays. Government regulations are drafted for certain properties of insulating materials, such as for non-burning properties and for sound insulation properties.

FIELD OF INVENTION

The present invention relates to a process for producing thermoset insulation foam in a shaped form. More specifically it relates to a process for producing thermoset insulation foams by condensation reactions. For the sake of clarity is stated here that in a condensation reaction various reactive groups combine with the formation of by-products such as water and/or formaldehyde and/or other small molecules, which are removed during the drying step. Examples of resins which polymerize according to a condensation reaction are: phenolic resins, aminoformaldehyde resins, and furan resins as well as modifications of these such as phenol-formaldehyde resins, urea-formaldehyde resins, melamine-formaldehyde resins, thiourea-formaldehyde resins and furan formaldehyde resins, and combinations of these with other resins such as isocyanates. More specifically the invention deals with a process for producing aminoformaldehyde foams and furan containing foams having less internal stresses, and which have a more homogeneous cure than the known foams.

In particular the process according to the invention is useful for obtaining insulating foams having an improved fire performance from furan or furfuryl alcohol modified phenolic resins and amino resins, and most particular the process is useful for obtaining urea-formaldehyde furfuryl alcohol based insulating foams having improved cure and an improved performance in the so-called muffle furnace test and related fire tests.

REQUIREMENTS FOR A FOAM PROCESS

1. The process should produce a foam where the raw materials are utilized in the most economical way—viz, should give:
   (a) minimal or no scrap
   (b) low density of the foam
   (c) a cell structure which is homogeneous with no weak areas limiting the mechanical properties.
2. The process should allow optimal reaction and cure of the resin. Thus it should:
   (a) allow a fast control of the temperature throughout the foam mass
   (b) allow the temperature changes to be programmed during production, in order to obtain optimal cure and a high rate of production without overreaction or damage to the cell structure
   (c) assure that all parts of the shaped foam material have received optimal cure so that no undercured areas limit the performance under service conditions and in fire tests or in an actual fire situation.

STATE OF THE ART

The standard process of making foams on a commercial scale is the so-called bun-stock process in which process the reacting components are mixed and brought on a moving conveyor with side walls. The mixture starts to foam and is allowed to rise freely till the reaction stops. The generated reaction heat cannot escape easily from the centre of the foam, thus causing high temperatures in the centre. In order to limit this, the reaction is made slow, by selection of the starting materials which put a limit on the choice of the raw materials and also has the drawback of a long conveyor line. In practice a compromise must be found. After the reaction has stopped, the foam block is trimmed and cut into the shape required by the particular uses being contemplated, whereby the sides of the block and especially the domed top is unusuable, causing considerable losses of valuable foam material.

In an attempt to avoid the above draw-backs, other foam moulding processes have been developed.

Relevant examples of such processes are:

A. U.S. Pat. No. 3,761,209 of St. Gobain wherein a process and apparatus for the manufacture of sheets, plates and blocks of thermohardening resins foam, particularly phenol-aldehyde foams, is disclosed.

A mixture of a phenol-aldehyde resin, a catalyst, a blowing agent and the usual additives is applied to a pre-heated conveyor having a non-adherent surface, at a temperature favourable to reaction and foam formation. A pre-heated upper conveyor limits the rise of the foam and gives the sheet the desired thickness. By heating the conveyor belts, the surfaces of the sheet are hardened to a dense strong skin which permits handling. To reduce the 12-15 hours time normally required to remove water from the interior of the foam it is subjected to a high frequency heating treatment.

Although according to said process a considerable reduction of the time required for drying is achieved, neither the desired uniformity of foam properties from core to sheet surface nor optimal fire properties of the sheet are obtained. Due to the fact that in said process during rise and cure, the sheet is confined between nonporous surfaces, the water initially present in the raw materials plus the water formed during the reaction is held within the sheet. During the early rise the temperature in the center of the sheet will be relatively high, which promotes a transport of water to the surfaces of the sheet. In later stages the surfaces are heated, whereby the water is concentrated in the centre and will dilute the acid hardener or catalyst. Consequently, the surfaces and the centre are subjected to very different conditions during the manufacturing process. Evidently this will cause serious differences in degree of cure, crosslinking and density with the result that the properties of the foam prepared will be non-optimal.

Moreover the dense skin which is part of the invention, will reduce the escape rate of water vapour from the sheet centre during the drying in the dielectric field. Likewise, at the high temperature generated in a dielectric field, gases that may not escape will cause a very high pressure that will damage cell structures and have a disadvantageous effect on foam properties. The skin obviously does not represent optimal use of the materials in terms of making an insulation material.

B. U.S. Pat. No. 3,821,337 of Esso wherein a process for preparing a foamed phenolaldehyde insulating board is disclosed. According to said process, a foamable resole resin is applied between two carrier sheets of a porous tissue, foaming and cure are induced by heating to 60° to 100° C. inside mold confining members, and subsequently the foamed resin is dried by subjecting it to microwave energy.

Due to the use of relatively porous carrier sheets sandwiching the foam, the escape of volatile materials during the final treatment by means of microwave energy is facilitated and consequently the damage of cell structures during said process step is reduced. However, since the foaming and curing take place between heated nonporous mold confining members the product obtained is still non-homogeneous and consequently its properties are not uniform.

C. U.S. Pat. No. 4,026,980 of ICI wherein a process is described in which an acid catalyst is added to a urea-formaldehyde resin solution and the gelling solution is transferred to a flat, open casting mould. If desired, the resin solution can be prefoamed mechanically by frothing. Now the gel is left to harden till it is sufficiently rigid to be taken out of the mould. Then the board is transferred to another mould which is closed and heated in a press at a temperature higher than 120° C. The resin expands further under these conditions and the resulting board has a density of 390 kg/m$^3$ till 760 kg/m$^3$ with a cell size smaller than 1 mm.

Also in this process the water originally present in the resin and liberated during the reaction, can hardly or not at all escape, necessitating a drying operation after the pressing step. Again this water tends to collect in the centre of the foam, causing nonhomogeneity through the foam. The mould is also heated over 100° C. to induce further expansion. Since this expansion takes place after the initial crosslinking of the resin, the cell walls will rupture. This is of limited consequence to foams with high densities, but detrimental to a foam if lower density for insulation purposes is desired.

D. U.S. Pat. No. 4,016,111 of Wolff in which a resin composition containing furfuryl alcohol, urea and formaldehyde and additives is foamed in the presence of an acid. The resin contains at least 10% by weight of a boron compound.

On a laboratory scale, small size panels can be prepared without serious problems and in the tests mentioned in the patent small foam blocks cut out showed excellent properties. However, in large scale operations it appeared to be difficult to perfectly control the foaming conditions in a large size mould. The different conditions in the core of the foam and in the foam near to the walls of the mould caused large variations in the foam properties including the fire properties, as a result of an uneven cure through the foam. Due to the uneven cure, the foam tend to take up water in humid conditions.

It is therefore an object of the invention to provide a process of making foamed polymer products of condensating resins, having a predetermined shape in which process the raw materials are utilized in the most economical way.

Another object of the invention is to provide a process which allows a fast control over the rise and the cure, thus giving a more uniform density throughout the shaped foam material and a better ratio of overall density to core density than hitherto possible.

A further object of the invention is to provide a process which allows close control of the temperature throughout the foam mass, and allows programming of the temperature inside the foam during production, giving optimal cure and a high rate of production without overreaction or damage to the cell structure.

It is also an object of the invention to provide a process of making shaped foam products, e.g. panels, which have an of making shaped foam products, e.g. panels, which have an excellent dimensional stability under service conditions.

Still another object of the invention is to provide a process of making foams which have a uniform homogeneous cell structure with closed cells. It is a particular object of the invention to provide a more controllable process which will assure that all parts of the shaped foam material have received optimal cure, so that no undercured areas limit the performance of the product under service conditions and in fire tests or in an actual fire situation.

THE INVENTION

The mentioned, and other, objects are achieved by a process in which polymer foams are produced from condensating resins, by reacting the starting materials (preferably a resin substantially derived from furfurylalcohol and a urea formaldehyde resin) in an enclosed mould cavity under conditions wherein the water formed during the reaction is substantially free to move out into a space adjacent to and in communication with said foam, and controlling the temperature and cure of said foam by regulation of the wet bulb temperature of the gaseous mass inside said space. Preferably the web bulb temperature of the gaseous mass inside said space is regulated in such a way that subsequent to the initial exothermic reaction a predetermined temperature over the time is induced throughout the foam till substantial completion of the cure has been achieved.

By using the invention it surprisingly appears possible to control the temperature change throughout an entire foam block so that a complete and even cure throughout a foam block can be obtained. This could never be achieved using the known processes.

This will be elucidated now:

In an attempt to achieve better control over the reaction conditions when the process described in U.S. Pat.

No. 3,919,127 was carried out, and simultaneously to obtain the foamed polymer in a predetermined form, the reaction was carried out in a metal walled shallow mould that could be closed.

It appeared that too much heat was extracted from the surfaces due to the large heat capacity of the metal wall of the mould, which resulted in foam collapse at the surface and an insufficient cure. A trial to heat the mould before-hand resulted in a very high exotherm, causing a burned centre of the foam.

In a next step a well insulated, adiabatic mould was used. This time a more even temperature distribution throughout the foam was achieved, but moisture was collected at the mould surfaces, causing damage to the foam surface. The moisture also caused an insufficient cure at the mould surface due to a dilution of the catalyst.

Then a perforated mould was made in order to allow escape of the moisture at the foam surface. However, this resulted in a dense foam skin and again an incomplete cure inside the foam. In order to compensate for this defect, the mould was heated by passing hot air over the perforated mould surfaces. This time a nice, rigid foam board having a high mechanical strength was obtained. However, said foam board became very weak under wet conditions, and it had a poor performance in fire tests, which again could be considered as an indication of a lack of cure.

It appeared also that in case the foaming reaction was carried out at an increased air temperature, the performance in fire tests became poorer as the air temperature used was higher. When the temperature inside the foam was recorded during the reaction, it appeared that a higher air temperature caused a lower temperature inside the foam. Quite surprisingly, it appeared that an optimal cure throughout the foam board can be obtained at a lower temperature if the wet bulb temperature of the air passing the foam is controlled.

Actually, at a constant dry bulb temperature it is possible to heat or cool the interior of the curing foam very rapidly by rising or lowering the web bulb temperature of the air passing the perforated mould. This is even more unexpected because the foams prepared according to the invention have a substantially closed cell structure and are good heat insulators. Also other insulating foams, which are prepared of noncondensating resins, such as polyurethanes hardly respond or are not responsive at all to such control.

It has been found now that in the production of condensation polymer foams by the present process the temperature inside the foam is closely related to and follows variations in the wet bulb temperature of the air in communication with the mould cavity. On the other hand the temperature inside the foam does not respond readily to substantial variations in the dry bulb temperature of said air.

This gist of the invention, therefore, is that the wet bult temperature is primarily used to control the temperature of the foam and hence to control the curing rate. The dry bulb temperature is primarily regulated with the object of heating the equipment sufficiently to prevent moisture condensating in the duct work and adjacent space.

In the process the wet bulb temperature of the air in communication with the mould cavity is controlled to values substantially equivalent to the temperatures desired inside the foam mass, at least during part of the curing process.

For instance the resin system may by allowed to foam and gel under its own exotherm heat and then be subjected to a constant wet bulb temperature in the range of 40° to 90° C. for a period long enough to complete the cure. For the highest speed of reaction it is often preferred to start at a relatively low wet bulb temperature such as 30° C. and raise the wet bulb temperature either continuously or stepwise to the final curing temperature which can be for instance 65° to 95° C. depending on the foam system. The rate at which the wet bulb temperature is increased should be high enough to make best use of the production facilities. On the other hand it appeared that too rapid temperature increase can lead to damage of the cell structure of the foam.

During the initial exotherm of the foam system the wet bulb temperature may be 5° to 20° C. below the temperature of the centre of the foam mass depending on the reactivity of the foam system and the cross-sectional area of the mould cavity.

For some systems it is found advantageous to leave the wet bulb temperature at an even lower level during the initial foam rise such as 40° C. below the temperature in the centre of the foam, but only after the initial foam rise the wet bulb temperature is brought up continuously or stepwise to the level at which the foam should precure. This may be for instance 40°–65° C. as the curing progresses, the temperature may then be further increased and the final wet bulb temperature may be as high as 75°–95° C.

In practice it appeared that the temperature inside the foam may be slightly higher than the wet bulb temperature of the air surrounding the mould, because some heat is produced during the cure.

It appeared that in practical execution of the process according to the invention, the dry bulb temperature of the air passing over and in close contact with the mould cavity can be substantially lower than at the point where the dry bulb temperature is controlled. This is due to the low heat capacity of air and unavoidable heat losses in the equipment. On the other hand, the wet bulb temperature of the air shows much less variation from the point where it is controlled to the point where it actually passes over the mould cavity. In the description of the process the setting of the dry bulb temperature is therefore peculiar for the equipment and will have to be higher if the air ducts leading to the mould space are long or less insulated in order to prevent moisture condensating in the duct work.

In the apparatus used in practising the present invention the conditions required may be achieved by raising the wet bulb temperature either continuously or stepwise from about 25° C. up to the range of 50°–95° C. during the cure of the foam, and simultaneously raising the dry bulb temperature from about 30° C. up to the range of 55°–110° C. For example, said conditions may be 45° C. wet bulb temperature and 75° C. dry bulb temperature for 1 to 5 minutes, then 60° C. wet bulb temperature and 85° C. dry bulb temperature for another 5 minutes; and finally 65° C. wet bulb temperature and 95° C. dry bulb temperature for a third period.

In the beginning of the process the difference between the wet and dry bulb temperature can be such that some excess moisture can evaporate from the foaming system, thereby controlling the exotherm reaction at the start of the curing reaction. The differences between wet and dry bulb temperatures can be for instance 6° to 15° C. at a dry bulb temperature of 30° C. up to 12° to 28° C. at a dry bulb temperature of 60° C. The latter temperature differences are used for slower reacting systems.

As the reaction proceeds less heat is produced in the curing foam and it appears to be useful to increase the wet and dry bulb temperatures while a temperature difference of 5° to 20° C. at 50° C. dry bulb temperature up to 10° to 30° C. at 90° C. dry bulb temperature is maintained. When primary curing has been completed substantially it may be useful to treat the foam at a wet bulb temperature of 60° to about 85° C. and a dry bulb temperature of 5° to 25° C. higher and preferably of 8° to 22° C. higher. The duration of this final process step can be from 5 minutes up to about 2 hours depending on the thickness of the foamed product. In practice a treatment time of 15 to 90 minutes is preferred for foam board having a thickness within the range of from 25 to 100 mm. This final treatment under controlled humidity conditions provides an excellent performance of the product in terms of fire resistance in the muffle furnace test, and dimensional stability and strength at a high himidity. If desired, once the primary cure is over and the foamed product has sufficient strength, it can be removed from the mould cavity and transferred to another space wherein the temperatures can be controlled as disclosed above.

After the primary cure, the foam board can be exposed to a more severe heat treatment without destroying the foam structure, e.g. by using high frequency energy, with the understanding that the required wet and dry bulb temperatures are maintained so that the moisture movement out of the foamboard is controlled sharply.

In a preferred version of the process, this heating with high frequency energy is carried out while the foam is still somewhat plastic and not fully crosslinked. After the high frequency treatment which may last from 1 to 5 minutes, the foam may be further cured at a controlled wet bulb temperature as indicated above. By giving the high frequency treatment at this early stage it appeared that the foam shows a much better dimensional stability that is, less permanent change in dimensions after exposure to a humidity test, than when the high frequency treatment is carried out at an advanced degree of foam cure.

In a preferred mode of carrying out the process a glassfibre tissue—more preferably a tissue made of glass staple fibres of 5-20 mm length bound with about 10 to 40% binder and having an area weight of 30-90 g/m²—is applied to the walls of the mould cavity to ensure a proper release of the foam board. Surprisingly, it was observed that said glass fibre tissue further improves various properties of the foam board, such as uniformity of the foam cells close to the surface of the foam board and it provides a still faster response to the inside of the foam to change in the wet bulb temperature. This may be caused by an increase in the surface area of the foam that is effectively exposed to the air in the adjacent space, when a porous glass tissue is used over the perforated mould walls.

The process will now be described in one of the possible ways as it can be carried out, taking full advantage of the various possibilities the process offers.

The starting material, i.e. the reactive resin component and the previously prepared catalyst mixture, are introduced into a mixing chamber through metering pumps. The thoroughly mixed material is deposited into a perforated mould cavity which is lined with glass fibre tissue. One of the methods to achieve an even distribution over the entire mould comprises the use of a reciprocating nozzle over a moving mould.

The temperature in the rising foam will increase rapidly. The temperature increase near the wall of the mould will follow more slowly due to the heat capacity of the mould. Air of a controlled wet bulb temperature is passed along the walls of the mould in order to control the amount of water to be evaporated from the foam. When the exotherm reaction has been completed substantially, the entire foam mass will approach gradually the wet bulb temperature of the air passing the mould. The wet bulb temperature is raised in steps of 5° to 10° C. per 5 minutes and the cure of the foam is advanced till the resulting foam has a sufficient strength to stand a more severe treatment, or until the foam board can be taken out of the mould without causing a deformation. The process is divided in 5 subsections in three of which the temperature of the foam is entirely controlled by the wet bulb temperature of the air passing the perforated mould, a fourth subsection wherein additional energy is supplied by a high frequency generator to obtain dimensional stability of the foam board under control of the condition of ventilating air, and a fifth subsection wherein air having a controlled wet bulb temperature is used to cure and crosslink the foam.

The following examples illustrate the process:

COMPARATIVE EXAMPLE 1

Two components A and B were pumped from storage tanks through a mixing chamber in a ratio of 20 parts "A" to 1 part "B". The mixture was deposited evenly on the bottom of a box shaped mould with dimensions 1.0×1.25×0.15 m. The mould had walls of Teflon coated steel 1 mm thick, backed by an insulating layer of 20 mm cellular polystyrene. A perforated lid was clamped over the mould and the mixture was allowed to foam, rise and cure inside the mould.

The two components had the following composition:

| A: | |
|---|---|
| Urea-formaldehyde-furfurylalcohol resin (Urea:formaldehyde ratio 1.85) | 100 pbw |
| Blowing agent Arcton R 11 of ICI | 15 pbw |
| Surfactant - (F88 of BASF) | 1 pbw |
| Filler - boric acid | 20 pbw |
| | 136 |
| B: | |
| 50% Phosphoric acid | 6 pbw |

Figure 1:
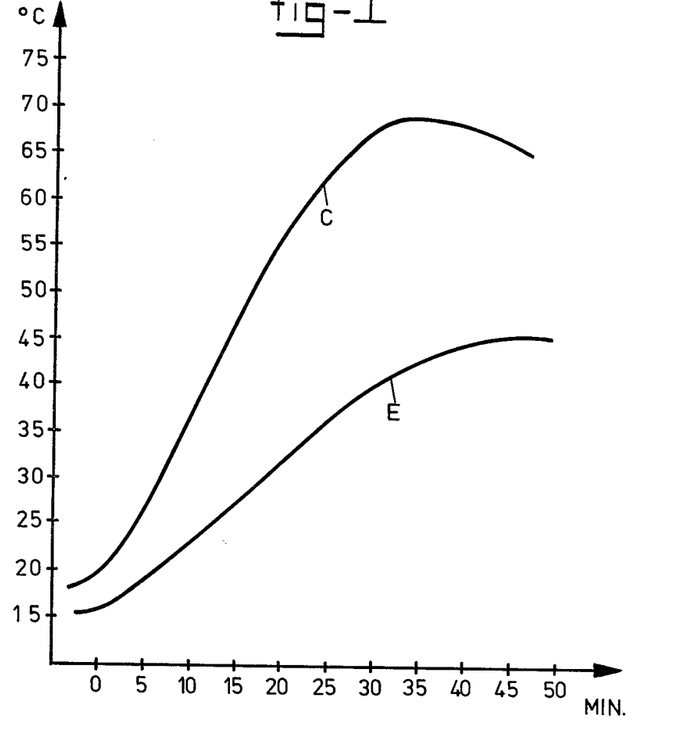
FIG. 1 is a graph showing the temperature curves during foaming and curing in the center (C) and close to the mold wall (E) during uncontrolled heat and humidity conditions.

During the foaming and cure the temperatures in the centre of the foam and close to the mould wall were recorded. The temperature curves are shown in FIG. 1.

After 50 minutes the mould was opened and the foam board was removed. The foam was allowed to postcure in a box oven at 70° C. overnight and then tested for density, cell structure, and 10% compressive strength at 23° C. 50% RH:

| | Bottom | Centre | Top |
|---|---|---|---|
| Density, in kg/m³: | 39.1 | 31.0 | 34.6 |
| 10% Compressive strength, in KPa: | 116 | 71 | 58 |

The foam board was found to have a dense layer at the surface.

The centre had a rather coarse cell structure with many damaged cell struts. The surface of the board was damaged in many places by water which had condensed on the mould's steel wall during cure.

It can be seen from the temperature curve C in FIG. 1 that the centre during cure has been exposed to a temperature which is significantly higher than at the edges (Curve E in FIG. 1). This results in an uncontrolled variation in density and poor and variable strength of the material. This Example clearly demonstrated the lack of control of the curing conditions in this known process and the unevenness of the foam properties resulting from it.

COMPARATIVE EXAMPLE 2

In a similar experiment the 1 mm steel walls of the mould were replaced by thin (50μ) aluminium foil in an attempt to obtain a more even density through the cross section of the foam board. However, during cure the temperature inside the foam rose, well over 80° C. Although the density was more even from top to bottom, the cell structure showed considerable damage and was very weak.

COMPARATIVE EXAMPLE 3

Into a shallow box shaped mould of 1.0×1.36×0.04 m was poured a mixture, obtained by carefully mixing a stream of urea-formaldehyde furfurylalcohol resin (urea to formaldehyde ratio 1:1.80) containing per 100 parts by weight of resin, 17 parts trichlorofluoro-methane, 2 parts silicone surfactant and 20 parts boric acid; with a stream of 70% phosphoric acid (10 parts by weight).

Figure 2:
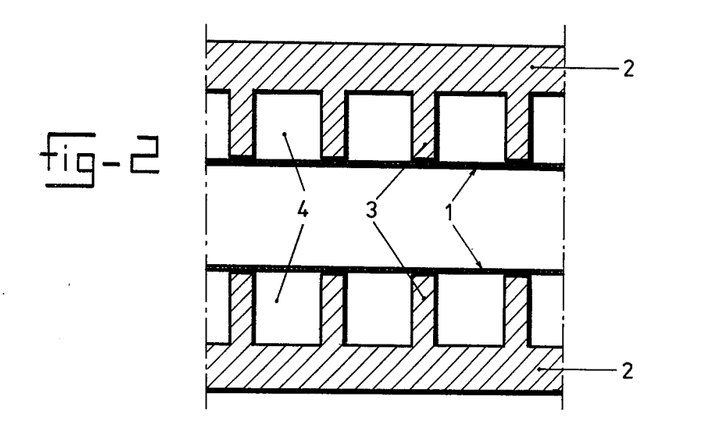
FIG. 2 is a cross-sectional view of the mold utilized in the process.

The mould top and bottom were made of 1 mm perforated steel-plate, supported by a series of wooden ducts extending across the mould from one edge to the other, which ducts were open adjacent to the perforated plate. Heated air could be passed through the ducts. The construction principle of the mould is shown in FIG. 2, where 1 is the perforated steel top and bottom, 4 are the open ducts through which air can be passed over the mould surface to heat or cool the mould and 3 is the foam.

Prior to filling of the mould, the mould walls were brought to a temperature of 25° C. After filling the mould top was put on and the mixture was allowed to rise and gel inside the mould cavity. After 2,5 minutes when the foam had gelled, ambient air heated to 55° C. was passed through the ducts from one edge to the other. After 15 minutes the heating was stopped and the foam removed from the mould and given 6 hrs postcure in a box oven heated to 65° C.

Figure 3:
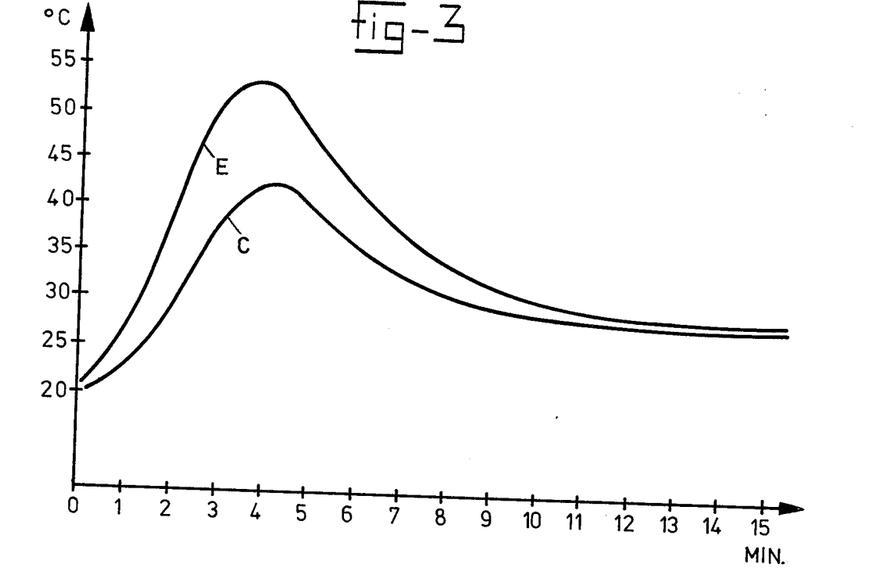
FIG. 3 is a graph showing the temperature curves during foaming and curing in the center (C) and close to the mold wall (B) during controlled heating conditions, but uncontrolled humidity conditions.

During the process, the temperature inside the foam was recorded and shown in FIG. 3. Unexpectedly the heating has resulted in a rapid temperature drop inside the foam. Shown by the drop of curve C below curve E in FIG. 3.

The foam board was rigid and had good cell structure. Compressive strength at 23° C. 50% RH was 205 KPa. When the foam, however, was tested in the muffle furnace test at 505° C. it failed seriously. Also the foam properties dropped off dramatically when put in water, indicating severe undercure.

EXAMPLE 1

Figure 4:
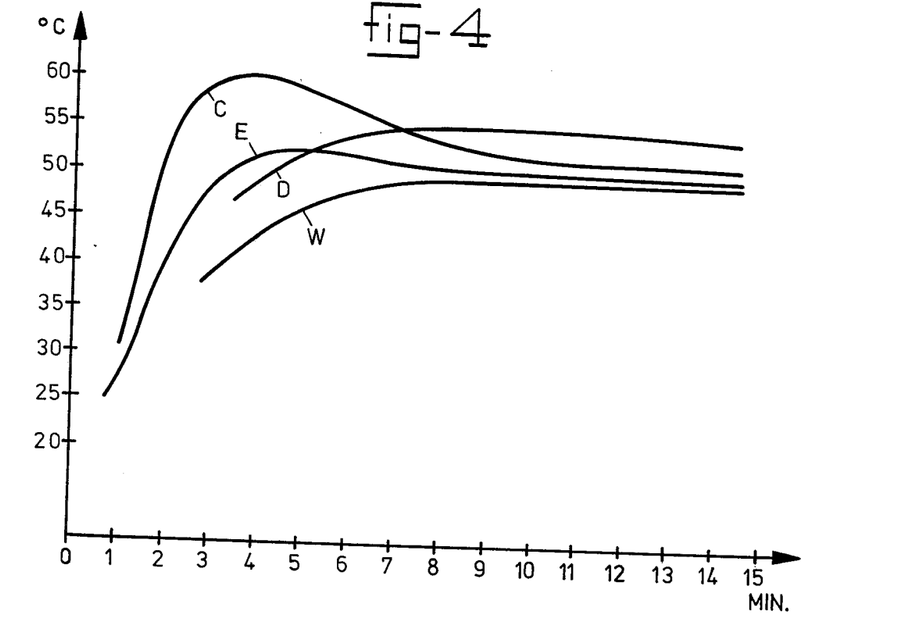
FIG. 4 is a graph showing the temperature curves during foaming and curing in the center (C) and close to the mold wall (E) during controlled heating and humidity conditions. The temperature curves for both the dry bulb (D) and wet bulb (W) as measured outside the mold are also shown.

Comparative Example 3 was repeated using same formulation and mould. When the foam inside the mould cavity had gelled, moist air with a wet bulb temperature of 50° C. and a dry bulb temperature of 55° C. (measured in the space adjacent to the mould cavity) was passed over the perforated mould walls. The various temperatures inside and outside the mould are shown in FIG. 4, wherein curve C is the temperature as measured in the centre of the foam, curve E is the temperature measured in the edge of the foam, and curves D and W are the dry and wet bulb temperatures as measured at the outside of the mould. It is seen that there is negligible temperature difference between foam surface and foam core during the cure. After 15 minutes the foam board was removed from the mould and left in an oven with forced circulation of air having T wet=55° C. and T dry=65° C. for 2 hours.

The foam board was rigid with a nice smooth surface and a very regular cell structure from top to bottom.

Compressive strength was 207 KPa at 23° C. 50% RH.

Edge density: 41 Kg/m$^3$, core density 37 kg/m$^3$.

When tested in the muffle furnace test at 505° C., the foam passed the test.

EXAMPLE 2

A foam was prepared from a furan resin using the formulation given in U.S. Pat. No. 3,919,127 (Example 36b). The mixture was evenly distributed on the bottom of a shallow box-shape mould 1.0×1.25–0.04 m and a lid was put on. The mould was of the same construction as in comparative Example 3 and Example 1. Five minutes after lay down the mould was heated by passing air of T wet=60° C., T dry=72° C. over the perforated mould surface for 25 minutes.

Temperature inside the mould showed a very even temperature distribution during cure.

After releasing the foam board was put into a gas tight envelope of polyester film and placed inside a box where it was heated to 80° C. (dry). The relative humidity in the sealed space surrounding the foam was recorded and remained between 55 and 65% RH during the 2 hrs. postcure. This corresponds to a wet bulb temperature of 68° C. to 71° C. during postcure.

The resultant foam board was stiff and rigid with an even cell distribution throughout the cross section and little variation in density and strength between core and surface foam. It passed the muffle furnace test.

EXAMPLE 3

The process of Example 1 was repeated with a phenol modified furfurylalcohol resin using the formulation of Example 6 of U.S. Pat. No. 4,108,809. The resultant foam board had a much more even density than when prepared in the conventional pressure conveyor process. Also the density and strength showed considerably less variation.

EXAMPLE 4

The foam of Example 1 was studied in the muffle furnace test using test samples of 3×3×3 cm. Whereas the foam passed the muffle furnace test at 505° C., it was found that at slightly higher temperatures such as 515° C., samples having skin at one surface did flash and in some instances even showed burning.

The test was now repeated using 3×3×3 cm test blocks, obtained by stacking of 0.5 cm 3×3 cm squares cut parallel to the foam board's surface at various depths in the foam. The samples cut from the centre of the foam passed the test, but the samples prepared from skinned foam gave inferior results and invariably gave flashing and burning, indicating less cure.

A new foam was now prepared using the same formulation and procedure as in Example 1 but prior to lay down, the mould surfaces were covered with a 50 g/m² tissue consisting of 12 mm glass fibres.

A foam was made and cured as in Example 1. The glass tissue used to line the mould was adhering to the foam surface but could easily be stripped off. When foam samples were subjected to the muffle furnace test as described above, they showed much better performance at 515° C. showing the better temperature control and cure obtained by use of the glass tissue as mould surface. Also, when tested with the adhering glass tissue left on the foam during the test, the performance in the muffle furnace test was much better.

EXAMPLE 5

Figure 5:
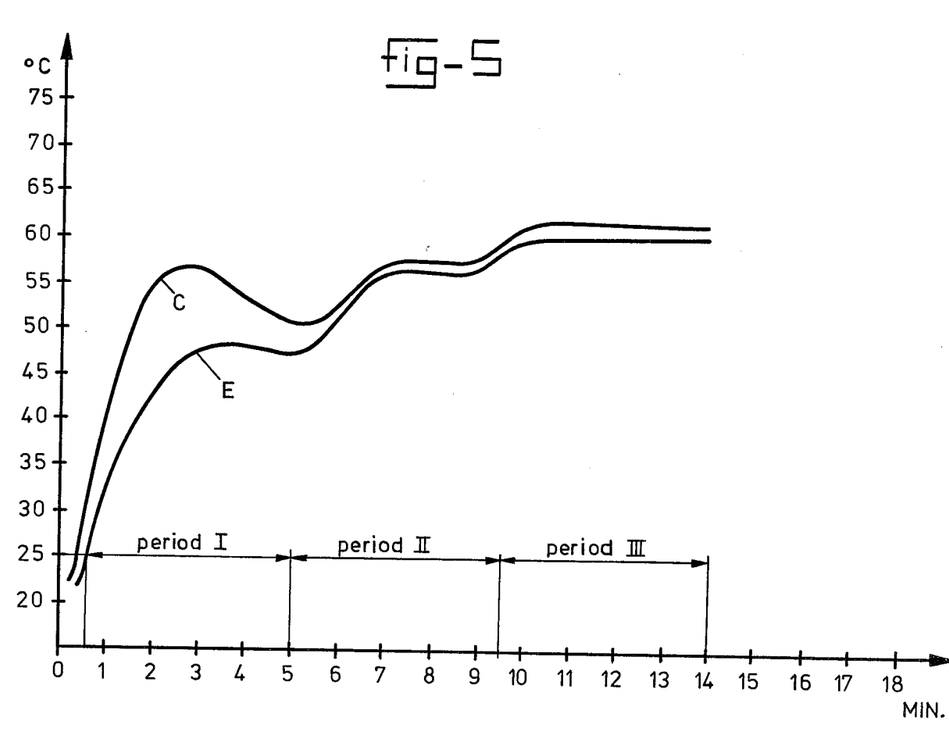
FIG. 5 is a graph showing the temperature curves during foaming and curing in the center (C) and close to the wall (E) when the mold is preheated and during controlled heating and humidity conditions.

A urea modified furfurylalcohol-formaldehyde resin containing 32% furfurylalcohol (bound and free) was made into a foam by reaction with an acid catalyst on the equipment described in comparative Example 3. The initial temperature of the mould was 27° C. The temperature of the resin-catalyst mix was 24° C. After the foam had started to rise, moist air with wet and dry bulb temperatures of 45° C. and 75° C., respectively, was passed through the space adjacent to the mould cavity for 4.5 minutes. The wet and dry bulb temperatures were then increased to 55° and 85° C. After 4.5 minutes a further adjustment to 60° C. and 90° C. was made and the temperatures were maintained for 5 minutes. The temperatures recorded in the centre and at the surface of the foam are shown in FIG. 5 (C=centre and E=edge). It is seen that there is virtually no temperature variation across the foam thickness during cure and the core temperature quickly reacts to any adjustment of wet bulb temperature in the space adjacent to the mould capacity. During the initial foam rise there is an exotherm which, however, is kept below 57° C. due to water evaporating into the controlled atmosphere in the adjacent space.

If the process is repeated without control of wet bulb temperature, larger temperature differences over the cross section of the foam board are observed, and the foam shows heavy sign of undercure when for example subjected to the TNO flash over test (NEN 3883).

COMPARATIVE EXAMPLE 4

A cellular urea modified furan polymer is produced on so-called pressure conveyor machine. The machine comprises a lower steel conveyor belt of sufficient length to let the foam rise and cure. This belt supports a siliconized release paper, the edges of which are folded so that a trough is formed.

A mixture of furfurylalcohol-modified urea formaldehyde resin with the usual additives and an acid catalyst is poured in a thin, even layer onto the release paper.

As the foam starts to rise a second layer of release paper is put on top of the foam. The rise of the foam is restricted by an upper steel conveyor belt which together with the lower defines the thickness of the foam board produced. The lower belt extends approx. 3 m from either end of the upperbelt. At the upstream end the lower belt is thermostated by contact with three water heated thermostatic plattens to initiate and control foam rise. At the downstream end the continuous foam slab produced is cut into boards of 2.44 m length and the release paper is removed.

The passage under the upper conveyor takes 14 minutes and during this period the two steel belts are heated to approx. 65° C. in order to promote the cure of the foam.

After cutting, the foam board is placed on a perforated shelf in an oven with forced circulation of air at 65° C. for 16 hours with the intention to dry and cure the foam.

The foam produced in this fashion has the following properties: Compressive strength at 23° C. 50% RH 135-160 KPa; compressive strength after 7 days at 95% RH 23° C.: 37-49 KPa; core density: 39 kg/m³. Edge density: 54 kg/m³.

The board has a skin of non-cellular polymer on top and bottom, but the skin on the bottom shows damage from water of reaction condensing on the surface during the initial cure.

The large variation in density between core and surface and similar variation in strength reflects the lack of control of temperature during the cure. Also the severe drop in strength when exposed to high humidity is an indication of lack of proper cure.

EXAMPLE 6

Comparative Example 4 is repeated with the understanding that after cutting the foam board is placed for 4 hours in an oven where the circulating air is humidified with water vapour to give a dry bulb temperature of 65° C. and a wet bulb temperature of 55° C.

When tested after 7 days at 95% RH 23° C. the foam has now a compressive strength of 85-112 KPa. It is clear that the cure has progressed to completion this time, although the damage to the cell structure introduced by lack of proper control of the foaming and curing conditions during the early part of the process, as disclosed in comparative example 4, cannot be repaired.

EXAMPLE 7

Example 5 was repeated using various combinations of wet and dry temperatures over the curing time of the foam. The conditions are given in the table.

TABLE

| Experiment No. | PROCRSS SETTINGS wet bulb temp./dry bulb temp./minutes | | | | | COMMENTS | |
|---|---|---|---|---|---|---|---|
| | Primary cure | | | | HF treatment | Further cure | d= Foam density | 6 =compression Strength |
| 1 | 40/70/7 | 55/80/5 | 65/100/8 | | HF 4 min., 0,8 A | 65/80/75 | d = 37,7 | 6 = 192 kPa |
| 2 | 40/70/7 | 55/80/5 | 65/100/3 | 70/101/5 | | 70/85/35 | d = 39,4 | 6 = 210 kPa |
| 3 | 45/70/5 | 60/80/3 | 75/100/3 | 80/101/7 | HF 4 min., 1,0 A | 80/95/15 | d = 33,6 | 6 = 232 kPa |
| 4 | 45/75/5 | 55/95/20 | | | | | | 6 = 198 kPa |
| 5 | 25→70 | 30→90/18 | | | | | Process temperatures raised continuously over process time 6 ≧ 200 kPa | |
| 6 | 40→95 | 55→105/18 | | | | | | |
| 7 | 35/50/4 | 41/50/7 | | | HF 6 min., 0,9 A | 72/85/30 | | 6 = 245 kPa |
| 8 | 35/50/3 | 45/55/9 | dwell overnight | | | 65/75/60 | | 6 = 215 kPa |
| 9 | 41/61/4 | 52/71/4 | 57/76/4 | | HF 2 min., 0,9 A | 75/90/30 | d = 41 | 6 = 205 kPa |
| 10 | 45/75/4 | 60/85/4 | 60/90/4 | | HF 2½ min., 1,1 A | 70/85/10 | Actual dry bulb temperature | |

TABLE-continued

| Experiment No. | PROCRSS SETTINGS wet bulb temp./dry bulb temp./minutes | | | COMMENTS | |
| --- | --- | --- | --- | --- | --- |
| | Primary cure | HF treatment | Further cure | d= Foam density | 6 =compression Strength |
| 11 | 60/70/3 | 70/85/7 | 80/105/15 | measured in air adjacent to mould cavity in 3 first periods is approx. 2-8° C. higher than wet bulb temp. Foam of high strength both dry and under wet conditions. structure damaged in this foam | |
| 12 | 40/70/5 | 55/80/5 | | 45/50/240 | |
| | 40/70/5 | 60/85/7 | | 80/100/30 | |

What is claimed is:

1. A process for the preparation of a foam having a predetermined shape, wherein in the presence of a catalyst, a blowing agent and additives a reactive resin component is subjected to a condensation reaction, characterized in reacting the starting materials in an enclosed mould cavity under conditions wherein the water formed during the reaction is substantially free to move out into a space adjacent to and in communication with said foam, and controlling the temperature and the cure of said foam by regulation of the wet bulb temperature of the gaseous mass inside said space.

2. A process according to claim 1 characterized in regulating the wet bulb temperature of the gaseous mass inside said space in such a way that subsequent to the initial exothermic reaction a predetermined temperature over the time is induced throughout the foam till substantial completion of the cure has been achieved.

3. A process according to claim 1 characterized in regulating the wet bulb temperature of the gaseous mass in communication with the foam at least over part of the process time to a value substantially equal to the temperature desired inside said foam.

4. A process according to claim 1 characterized in raising the curing temperature inside said foam, by increasing the wet bulb temperature of the gaseous mass in communication with said foam, either continuously or stepwise.

5. A process according to claim 3 or 4 characterized in regulating the wet bulb temperature to about 0°-5° C. below the cure temperature desired inside said foam.

6. A process according to claim 2 characterized in adjusting the wet bulb temperature of the air passing the foam within the range of 25° C. up to the range of 50° to 95° C. and simultaneously maintaining the dry bulb temperature of said air from 30° C. up to about 55° to 110° C.

7. A process according to claim 6 characterized in subjecting the primary cured foam to a high frequency energy treatment.

8. Process according to claim 1 characterized in that the high frequency energy treatment is followed by a further treatment at a controlled wet bulb temperature.

9. A process according to claim 1 characterized in improving the communication of said foam and said gaseous mass by covering the internal surfaces of said mould with a glass fibre tissue prior to the foaming operation.

10. A process according to claim 9 characterized in using a tissue made of glass staple fibres of 5-20 mm length and having a glass area weight of 30-90 gr/m$^2$.

11. A process according to claim 1 characterized in using a resin substantially derived from furfuryl alcohol as the starting material.

12. A process according to claim 1 characterized in using a urea formaldehyde resin as the starting material.

13. A process according to claim 1 characterized in using phenolic resins modified with furfuryl alcohol as the starting material.

14. Thermoset insulation foam products, manufactured in a shaped form by a process according to claim 1.

* * * * *